United States Patent Office 3,047,524
Patented July 31, 1962

3,047,524
GLYCOLIC ACID POLYMER
Norman J. Bowman, Philadelphia, Pa., assignor to Standard Oil Company, Chicago, Ill., a corporation of Indiana
No Drawing. Original application Sept. 30, 1957, Ser. No. 687,853. Divided and this application Mar. 19, 1959, Ser. No. 800,596
6 Claims. (Cl. 260—32.4)

This is a division of my co-pending Serial No. 687,853, filed September 30, 1957.

This invention relates to an organic polymer.

In the field of solid propellants based on ammonium nitrate as the oxidizer binders are used to permit the formation of shaped grains. For reasons of economy of manufacture, it is desirable that the grain have qualities which permit formation by extrusion. In order to attain this end polymeric materials such as cellulose esters and polyvinyl chloride are combined with plasticizers to produce thermoplastic compositions which can be combined with the ammonium nitrate to form plastic masses at temperatures of about 100° C. It is obvious that preparation of a plasticized polymer binder introduces complications into the propellant manufacture.

An object of the invention is an organic polymeric material. A particular object is an organic polymer suitable, as such, for manufacture of ammonium nitrate type solid propellants. Other objects will be apparent in the course of the detailed description.

The composition of this invention consists essentially only of a homopolymer of glycolic acid which polymer has a melting point between 90° C. and about 130° C. and an aliphatic alcohol containing from 1 to 6 carbon atoms with the alcohol being present in an amount between about 1 and 5 mol percent.

The 70 percent aqueous glycolic acid solution is a particularly suitable source of acid for the homopolymerization step. In order to maintain the polymer at the desired characteristics an aliphatic alcohol containing from 1 to 6 carbon atoms is added to the polymer to form the composition. The alcohol may be monohydric, such as, methanol, propanol, allyl alcohol or hexanol. The alcohol may be dihydric, such as ethylene glycol, propylene glycol, diethylene glycol, or dipropylene glycol. A trihydric alcohol such as, glycerin may also be used. In addition to the alcohols containing only carbon, hydrogen and oxygen other substituents may be present, such as, nitro groups, for example nitromethyl propanediol.

The polymer is produced essentially in the manner well known for carrying out of homopolymerization of materials of this particular type. In general, the glycolic acid (hydroxy acetic acid) is introduced into the polymerization zone, which is provided with a reflux condenser and the zone is heated to about 150° C. at atmospheric pressure. At this temperature the polymerization proceeds with the production of water, which water is taken overhead in order to drive the reaction to completion. When the rate of water evolution decreases vacuum may be applied to the system or the temperature increased in order to carry the polymerization to completion as determined by the desired melting point. Increasing the temperature increases the rate of polymerization and temperatures as high as 200° C. or even higher may be used.

When aqueous glycolic acid is charged to the reactor the solvent water may be distilled off at a temperature lower than that needed to push the polymerization at a significant rate. The completion of the reaction is indicated by the essentially complete cessation of water vapor production from the reaction zone.

When the desired melting point is reached, the polymer product may be cooled to ambient temperature and then blended with the defined alcohol. The alcohol is added in an amount between about 1 and 5 mol percent, calculated on the original glycolic acid charged to the polymerization zone. The amount of alcohol used is dependent somewhat on the type of alcohol. When ethylene glycol is the alcohol added it is preferred to use between 2 and 3 mol percent.

In order to more completely stabilize the polymer characteristics, it is preferred to add the alcohol just before the polymer reaches the desired melting point and continue the heating until that point is reached.

The composition is a tough waxy solid and can be used with ammonium nitrate to form plastic materials at about 90–100° C., which can be molded or extruded into shaped propellants. In general between about 15 and 30 weight percent of the composition is present in the propellant. It is to be understood that other materials may be present in the propellant, e.g., combustion catalyst, carbon, inhibitors and burning rate promoters.

The composition is compatible with, to a more or less considerable degree, these and other organic polymers: The cellulose esters of acetic acid, propanoic acid and butyric acid, including the mixed esters; examples of these are cellulose acetate, cellulose butyrate, and cellulose acetate propionate. The polyvinyl polymers namely, polyvinyl butyral, polyvinyl chloride, and polyvinyl acetate. Polyacrylonitrile is a suitable polymer. The co-polymers of styrene and acrylonitrile are also plasticizable. For the purposes of this disclosure petroleum asphalt is defined as an organic polymer. In addition to the asphalts which are naturally occurring or obtainable by distillation from crude oil or propane precipitation from crude oil, asphalts which have been obtained by oxidation of petroleum materials are plasticizable. An example of a particularly suitable asphalt is a roofing grade material obtained by air-blowing a petroleum residuum; this asphalt has a softening point falling within the range of 215–235° F. a Cleveland Open Cup flash point above 550° F. and an ASTM penetration of more than 0.8 mm. at 32° F and not more than 4.00 mm. at 115° F. The polymers may be added to a propellant to meet special require ments, such as improved rigidity at high temperatures Also some military specifications to be met with ammonium nitrate solid propellants may require the presence in the binder of a plasticizer (as well as a polymer).

These plasticizers are in general oxygen containing or ganic materials. Broadly any of the plasticizers known for one or more of the polymers may be used to some extent in combination with the defined composition alone or in conjunction with a polymer. In addition to oxy gen many of the better adjunct plasticizers contain nitro groups. Examples of several broad classes of material: suitable for use as plasticizers are set out hereinafter along with illustrative compounds from each of these broad classes which list is intended to be a guidepost for the workers in this art. Suitable plasticizers are:

A. Di-lower alkyl-phthalates, e.g., dimethyl phthalate, dibutyl phthalate, dioctyl phthalate and dimethyl nitrophthalate.
B. Nitrobenzenes, e.g., nitrobenzene, dinitrobenzene, nitrotoluene, dinitrotoluene, nitroxylene, and nitrodiphenyl.
C. Nitrodiphenyl ethers, e.g., nitrodiphenyl ether and 2,4-dinitrodiphenyl ether.
D. Tri-lower alkyl-citrates, e.g., triethyl citrate, tributyl citrate and triamyl citrate.
E. Acyl tri-lower alkyl-citrates where the acyl group contains 2-4 carbon atoms, e.g., acetyl triethyl citrate and acetyl tributyl citrate.
F. Glycerol-lower alkanoates, e.g., monoacetin, triacetin, glycol tri-pionate and glycerol tributyrate.
G. Lower alkylene-glycol-lower alkanoates wherein the glycol portion has a molecular weight below 200, e.g., ethylene glycol diacetate, triethylene glycol dihexoate, triethylene glycol dioctoate, polyethylene glycol dioctoate, dipropylene glycol diacetate, nitromethyl propanediol diacetate, hydroxyethyl acetate and hydroxy propyl acetate (propylene glycol monoacetate).
H. Dinitrophenyl-lower alkyl-lower alkanoates, e.g., dinitrophenyl ethyl-acetate, and dinitrophenyl amyl-octoate.
I. Lower alklene-glycols wherein the molecular weight is below about 200, e.g., diethylene glycol, polyethylene glycol (200), and tetrapropylene glycol.
J. Lower alkylene-glycol oxalates, e.g., diethylene glycol oxalate and polyethylene glycol (200) oxalate.
K. Lower alkylene-glycol maleates, e.g., ethylene glycol maleate and bis-(diethylene glycol monoethyl ether) maleate.
L. Lower alkylene-glycol diglycolates, e.g., ethylene glycol diglycolate and diethylene glycol diglycolate.
M. Miscellaneous diglycollates, e.g., dibutyl diglycollate, dimethylalkyl diglycolate and methycarbitol diglycollate.
N. Lower alkyl-phthalyl-lower alkyl-glycollate, e.g., methyl phthalyl ethyl glycollate, ethyl phthalyl ethyl glycollate and butyl phthalyl butyl glycollate.
O. Di-lower alkyloxy-tetraglycol, e.g., dimethoxy tetraglycol and dibutoxy tetraglycol.
P. Nitrophenyl ether of lower alkylene glycols, e.g., dinitrophenyl ether of triethylene glycol and nitrophenyl ether of polypropylene glycol.

*Example I*

Five hundred grams of 70 percent aqueous glycolic acid (4.6 mcls) were placed in a flask provided with a reflux condenser and water trap-out. The flask was rapidly heated to 150° C. at atmospheric pressure and the water vapor produced was continuously removed from the reaction zone. It was observed that for about 2 hours the temperature remained between 115° and 130° C. during which the solvent water appeared to distill. Then the temperature rose more rapidly and polymerization began to take place rapidly with steadily increasing temperature in the flask. At 150° C. the pressure in the flask was reduced to 10-25 mm. Hg and the temperature rapidly raised to 170° C. When this temperature was reached heating was discontinued and the vacuum was changed to atmosphere pressure and the flask was then cooled to about 125° C. At this time 15 grams of ethylene glycol (0.25 mols) was added and the flask held at about 125° C. for 1 hour. At the end of this time the product was removed from the flask. Approximately a 95 percent yield of the theoretical amount was obtained of a material having a melting point of about 115° C.

*Example II*

Five hundred grams of 70 percent aqueous glycolic acid was introduced into a flask. The flask was then heated to about 130° C. until the solvent water had been removed. Then the heating was continued at atmospheric pressure and periodically portions of the flask contents were removed and tested for melting point. When the temperature was about 190° C. the melting point of the contents was about 115° C. The heating was then stopped and the contents rapidly cooled to 135° C., 15 grams of ethylene glycol were added to the flask and the contents held at 135° C. for 1 hour. The final product from the reaction had a melting point of 115° C.

*Example III*

The procedure of Example I was repeated except that n-butanol was used instead of ethylene glycol. The reaction product was in all respects identical to that obtained with ethylene glycol.

RUN NO. 4

In this run the glycolic acid was heated until essentially all water evolution ceased. No alcohol was added to the flask during the run. The reaction product was a hard brittle material having a melting point of about 165° C. This material did not have the toughness needed for use as a propellant binder and was not compatible to any degree with organic polymers.

*Example V*

Two propellant grains were prepared by heating the reaction product of Example I to about 100° C. At this temperature the material although still solid was plastic and ammonium nitrate could be kneaded into the material to form a plastic mass. This plastic mass could be cast or extruded into shaped propellants. Two different propellant compositions were prepared which had characteristics suitable for JATO use or use as explosives. One propellant consisted of ammonium nitrate 78 weight percent, inorganic combustion catalyst and additives 6 weight percent and reaction product of Example I 16 weight percent. The other propellant consisted of ammonium nitrate 73 weight percent, combustion catalyst and additives 4 weight percent and reaction product of Example I 23 weight percent.

*Example VI*

Several thermoplastic compositions which had the rubbery characteristics needed for ammonium nitrate binders were prepared using organic polymers and plasticizers. These thermoplastic compositions are:

Glycolic acid product 85 percent and polyvinyl acetate 15 percent. (All percentages in this example are by weight.)

Glycolic acid product 80 percent, polyvinyl acetate 14 percent and triethyl citrate 6 percent.

Glycolic acid product 75 percent, polyvinyl acetate 20 percent, and triethyl citrate 5 percent.

Glycolic acid product 77 percent, cellulose acetate 16 percent, and dimethyl phthalate 7 percent.

Glycolic acid product 30 percent, cellulose acetate butyrate 30 percent, asphalt 10 percent and triethyl citrate 30 percent.

When propellants containing the glycolic acid product of the invention were fired in Static Engine Tests it was observed that the flame temperature of the exhaust gases was lower than the flame temperature of propellants which did not contain glycolic acid. By the use of a propellant consisting only of the glycolic acid product, ammonium nitrate propellants having desirably low flame temperatures were obtained.

Thus having described the invention, what is claimed is:

1. A composition consisting essentially of the homopolymer of glycolic acid which polymer melts between 90° C. and about 130° C. and between about 1 and 5 mol percent of an alcohol selected from the class consisting of (a) aliphatic alcohols containing only hydrogen, oxygen and 1-6 carbon atoms and (b) nitroaliphatic alcohols containing only hydrogen, oxygen, 1-6 carbon atoms and a nitro substituent.

2. The composition of claim 1 where said alcohol is ethylene glycol.

3. The composition of claim 1 where said alcohol is butanol.

4. The composition of claim 1 where said alcohol is nitromethyl propanediol.

5. The substance of claim 1 where said alcohol is ethylene glycol and said amount is between 2 and 3 mol percent.

6. A composition consisting of a polymer prepared by heating glycolic acid to a temperature between about 150° C. and 200° C. under conditions affording homopolymerization of said acid while removing water formed in said polymerization of said acid, and between about 1 and 5 mol percent of an alcohol selected from the class consisting of (a) aliphatic alcohols containing only hydrogen, oxygen and 1–6 carbon atoms and (b) nitroaliphatic alcohols containing only hydrogen, oxygen, 1–6 carbon atoms and a nitro substituent.

No references cited.